B. WALCH.

Augers.

No. 5,238. Reissued Jan. 14, 1873.

Witnesses:

H. J. Aretz

Thos. D. D. Cunard

Inventor:

Blase Walch.

PER Wm. H. C.

Attorneys.

AM. PHOTO-LITHOGRAPHIC CO. N.Y. (OSBORNE'S PROCESS.)

UNITED STATES PATENT OFFICE.

BLASE WALCH, OF FREDERICK, MARYLAND.

IMPROVEMENT IN AUGERS.

Specification forming part of Letters Patent No. 111,099, dated January 17, 1871; reissue No. 5,238, dated January 14, 1873.

*To all whom it may concern:*

Figure 1:
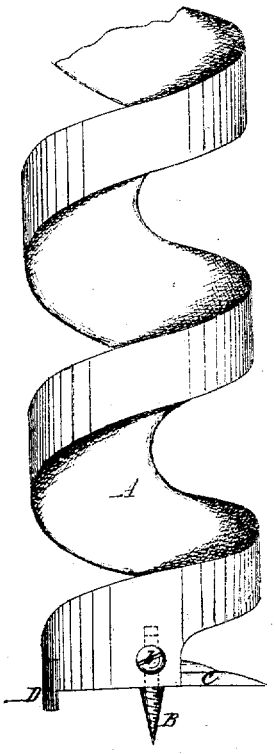
Figure 2:
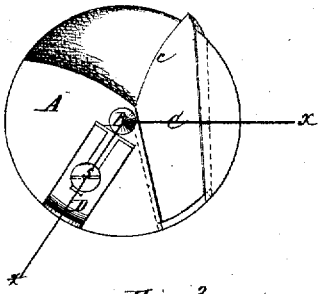

Be it known that I, BLASE WALCH, of the the city and county of Frederick, in the State of Maryland, have invented an Improved Auger, of which the following is a specification:

Figure 1 is a side view; Fig. 2, a bottom view; and Fig. 3, a section through line *x x* of Fig. 2.

The invention will first be fully described and then clearly pointed out in the claim.

Figure 3:
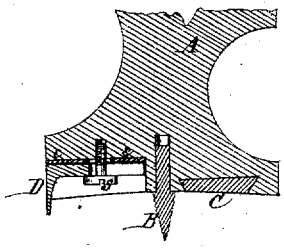

In the drawing, A is the auger, and C is a cutter, fitting into a dovetail groove or bed in the bottom of the same, so as to have its sharpened edge and point projecting from the side of the auger, as shown in Fig. 2. B is the center screw or bit, formed with a tang, which fits into a socket in the face of the auger, and capable of being adjusted vertically in the socket by means of a lateral set-screw, *b*, or pin. D is a cutter, held in a radial slot or bed in the face of the auger, and capable of being adjusted therein toward or from the center of the auger by means of a slot and set-screw, *s*. The outer edge of this cutter is in the form of a turned-down flange, curved concentrically with the convex surface of the auger, and sharpened along its under edge; and the bed in which it works is situated so that its median line is nearly or quite in line with the sharp edge of cutter C, as shown in Fig. 2. The cutting-edge of the blade C is slightly curved, as shown at *c*, so that it can be sharpened without grinding away the point too much; and the blade is made wide at one end and thicker on one side than the other, as shown in Figs. 2 and 3, so as to preserve the same level where the cutting-edge is narrow as where it is wider.

The cutter D can be vertically adjusted by inserting between it and the bed in which it lies a plate or plates, *e*, of any suitable material, and of the required shape and thickness.

In practical operation the cutter C is simply inserted in its dovetail groove or bed, its position being such that the movement of the auger tends to force it the more firmly into its socket, and not to allow it to work out or become loose. The center-screw and the vertical cutter are adjusted as described, being moved down as they wear away, so as to cut always at the same distance from the face of the auger. The instrument is then employed in the same manner as an ordinary hand-auger, although, of course, the same appliances can be used in connection with machine-augers.

By this construction it is obvious that the whole auger, except the center-point and cutters, can be made of iron, the latter being made of steel, and renewed from time to time as they wear away.

Having thus described my invention, what I claim as new, and desire to secure by Letters Patent, is—

1. An independent circumferential cutter, D, adjustable as and for the purpose described.

2. The combination, with an auger, A, of two cutters, C D, relatively constructed and arranged to operate as and for the purpose described.

Witnesses: BLASE WALCH.

CHAS. A. PETTIT,

THOS. D. D. OURAND.